W. R. SMITH.
SPRING CONSTRUCTION.
APPLICATION FILED MAR. 1, 1909.
935,703.
Patented Oct. 5, 1909.
3 SHEETS—SHEET 1.
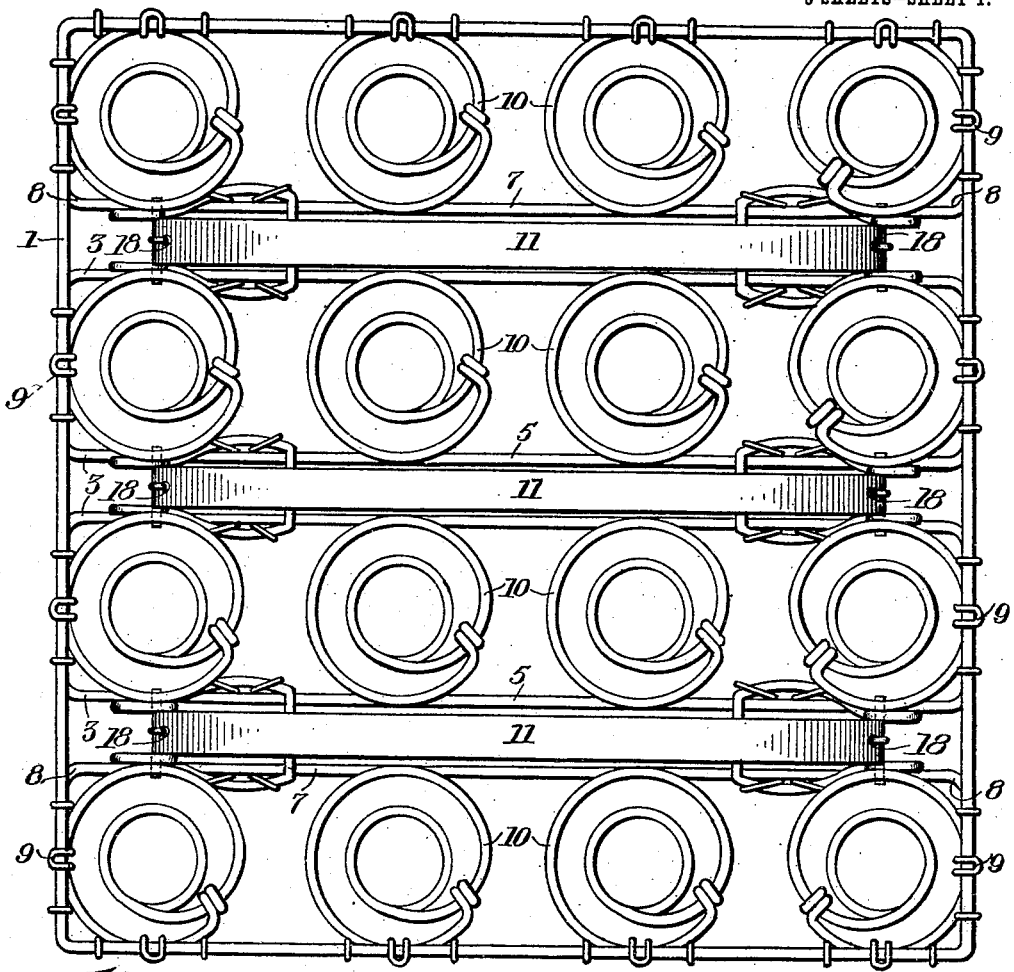
Fig. 1.
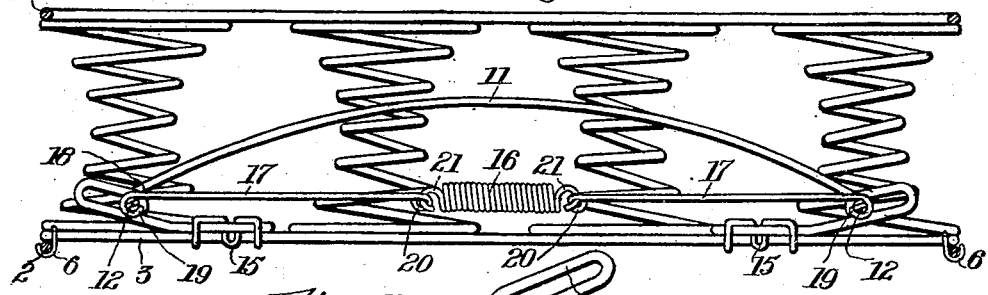
Fig. 2.
Fig. 3.
Witnesses
Inventor
Watson R. Smith
By
Attorney

W. R. SMITH.
SPRING CONSTRUCTION.
APPLICATION FILED MAR. 1, 1909.

935,703.

Patented Oct. 5, 1909.
3 SHEETS—SHEET 2.

W. R. SMITH.
SPRING CONSTRUCTION.
APPLICATION FILED MAR. 1, 1909.

935,703.

Patented Oct. 5, 1909.
3 SHEETS—SHEET 3.

Witnesses
Inventor
Watson R. Smith
By
Attorney

UNITED STATES PATENT OFFICE.

WATSON R. SMITH, OF JACKSON, MICHIGAN, ASSIGNOR TO JACKSON CUSHION SPRING CO., OF JACKSON, MICHIGAN.

SPRING CONSTRUCTION.

935,703.      Specification of Letters Patent.      Patented Oct. 5, 1909.

Application filed March 1, 1909. Serial No. 480,763.

*To all whom it may concern:*

Be it known that I, WATSON R. SMITH, a citizen of the United States, residing at Jackson, in the county of Jackson and State of Michigan, have invented certain new and useful Improvements in Spring Constructions, of which the following is a specification.

This invention relates to spring constructions.

One object is to provide a spring construction for automobiles, couches, or other seats or beds, embodying such characteristics that the rider of the structure will not be injured or inconvenienced by reason of contact with the support upon which the structure is mounted in the event that the seat should be unduly compressed or jarred incident to the natural weight of a heavy rider or by reason of the vehicle contacting with an obstruction in the roadway.

Another object of the invention is to reinforce the main springs of the structure with one or more auxiliary arch springs adapted to be compressed only when the structure is subjected to unusual weight, whereby the auxiliary springs will catch the extra weight and prevent the structure from being wholly compressed, the arch springs being so mounted that when compressed there will not be a spreading of the main frame of the structure.

A still further object is to provide a spring construction embodying main and auxiliary arch springs with means associated with the auxiliary arch springs to maintain them under tension and to operate upon the auxiliary arch springs when relieved of pressure to bring them into their normal operative positions.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

Figure 4:
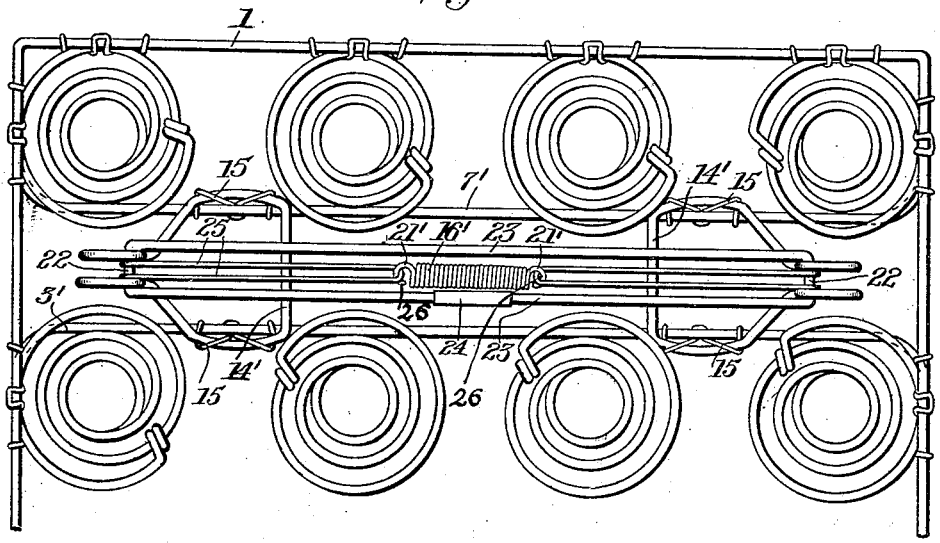
Figure 5:
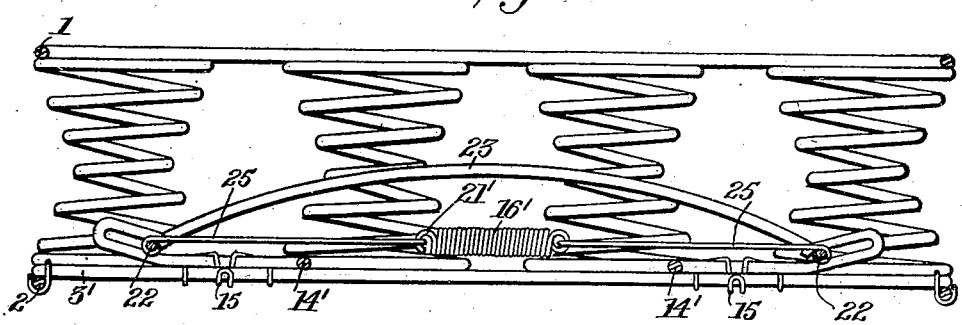
Figure 6:
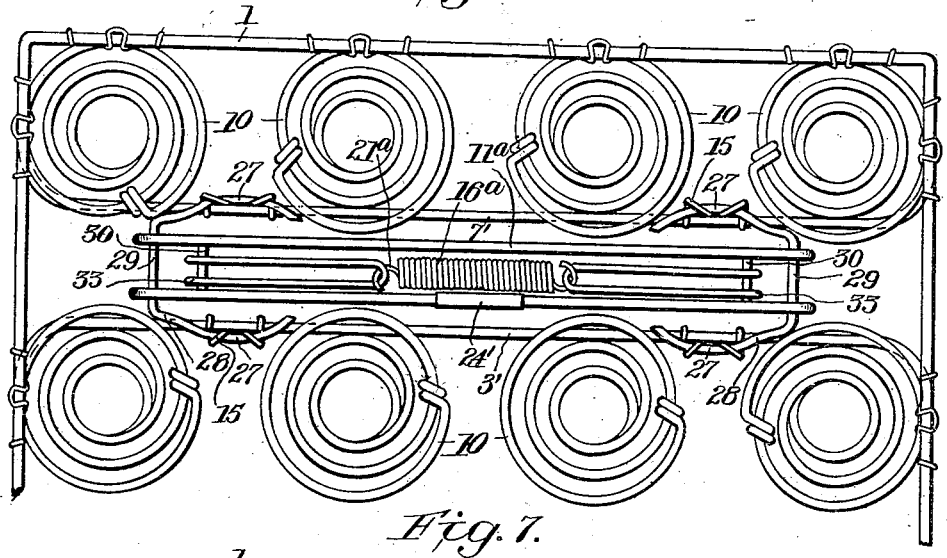
Figure 7:
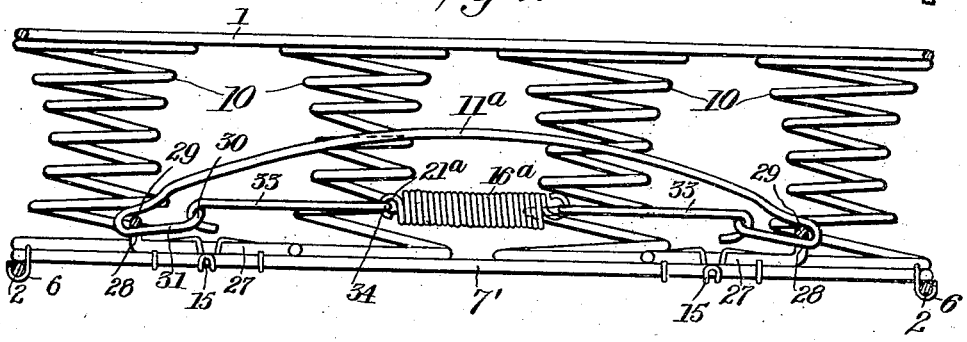
Figure 8:
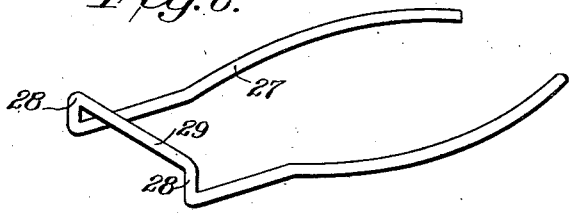

In the drawings:—Figure 1 is a plan view of one form of the invention. Fig. 2 is a transverse sectional view. Fig. 3 is a detail perspective view of one of the feet or base members which support the auxiliary arch spring. Fig. 4 is a top plan view of a portion of a spring construction embodying a second form of invention. Fig. 5 is a transverse sectional view. Fig. 6 is a top plan view of a portion of a spring construction embodying a third form of invention. Fig. 7 is a transverse sectional view, and Fig. 8 is a detail perspective view of a modified type of feet or base supporting members for the auxiliary arch springs.

Referring now to the accompanying drawings, and more particularly to Figs. 1 to 3, inclusive, the reference characters 1 and 2 indicate upper and lower edge wires of the frame which may be rectangular or of any other formation.

The reference character 3 indicates endless spring supporting wires, secured to the lower edge wire by means of suitable clips 6. These continuous stay wires are employed preferably throughout the structure, except at the ends thereof, where the supporting wires 7 are not continuous, but have their opposite ends directed in the same direction, laterally, as at 8, into overlapping relation with the lower edge wire and secured to the latter by means of suitable clips 9 shown to be the same in form as clips 6 except that they are reversed with respect to position. These support wires 7 coöperate with the ends of the lower edge wire for the support of the end rows of main springs, the main springs being indicated by the reference character 10, and some of them are shown as mounted upon the continuous supporting wires 3.

Within the frame I employ auxiliary arch springs 11 which are arranged preferably between rows of main springs and, as shown in Figs. 1 to 3, inclusive, the auxiliary arch springs are formed of flat spring metal and secured to each end thereof is a bar 12, whose ends project upon opposite sides of each auxiliary spring for slidable engagement in the oppositely disposed guides 13 of the feet or base portions 14, the feet or base portions 14 being arranged in pairs at opposite sides of the structure and each having its outer end slightly elevated to raise the guides 13 slightly above the main spring supporting wires, and upon an incline, as shown. These feet or base portions 14 may be secured to the main spring supporting wires in any suitable manner, one means residing in the clips 15.

The auxiliary arch springs are entirely independent of the main springs and are not compressed at the initial compression of the main springs, but only after the main springs have been subjected to compression, or in other words when the weight of the rider is such as to compress the structure sufficiently to cause compression of the auxiliary arch springs.

The auxiliary arch springs being composed of spring metal, they tend to assume their normal positions when relieved of pressure, but in order to insure the auxiliary springs assuming their normal positions, they are maintained under tension through the instrumentality of a horizontally disposed helical or other spring 16 disposed beneath each auxiliary arch spring between which and the ends of the auxiliary arch springs are link connections 17, the ends of the auxiliary arch springs being provided with an opening 18 into which the outer ends of the links 17 may be passed in the formation of a hook 19, which in its passage through said openings 18, embraces the aforesaid bars 12, the inner ends of each link having a hook 20 adapted to interlock with the hooks 21 of the horizontally disposed helical spring 16. By virtue of this tensioning means, the ends of the auxiliary arch springs and their bars 12 are brought to the inner ends of the aforesaid guide ways 13 when the auxiliary arch springs are relieved of pressure. The weight of the rider, when brought to bear upon the auxiliary arch springs will overcome this tensioning means and permit the ends of the auxiliary arch springs and their bars 12 to ride upwardly in the upwardly directed guide ways 13 when the auxiliary arch springs are compressed. Just as soon as relieved of pressure, the springs 16 cause the ends of the auxiliary arch springs and their bars 12 to be brought downwardly in the guide ways 13 to their normal positions, as already stated.

In Figs. 4 and 5, there is shown a second form of invention, wherein the structure embodies the upper and lower edge wires 1 and 2, together with the spring supporting wires 3' and 7', and the feet or base supporting members 14' are the same as in the first form described. However, instead of forming the auxiliary springs of a single piece of flat metal, as in the first form, I form the auxiliary arch springs of a single piece of wire bent to provide end portions 22 and spaced parallel body portions 23, with the meeting ends of the wire coupled together by means of a suitable sleeve 24. The end portions 22 of this second type of auxiliary spring slide in the upwardly directed guide ways 13' of the feet or base portions 14', thereby dispensing with the bars 12 of the first form of the invention. In this second form I employ a tensioning means for the auxiliary springs which is practically the same as the tensioning means hereinbefore described, except that in the second form of the invention the links 17 include a single piece of material bent to form parallel members 25 with their bight portions 26 disposed at the inner ends thereof and fitted over the hooks 21' of the helical spring 16' with their extremities embracing the end portions 22 of the auxiliary arch spring. The operation in this second form is precisely the same as in the first form of invention.

Referring to Figs. 6 to 8, inclusive, there will be seen a third form of invention, wherein the upper and lower edge wires, the supporting wires and main springs of the other structures are employed. However, the feet or base supporting members 27 of the auxiliary arch springs are not employed with the aforesaid upwardly directed guide-ways, but each has its outer end directed upwardly substantially vertically at 28, and terminating in a horizontally disposed bight portion 29. In this instance, the auxiliary arch springs 11$^a$ are formed of a single piece of material to provide spaced parallel members, with the meeting ends of the material coupled together by means of a suitable sleeve 24'. The ends of the auxiliary springs in this third form of invention are bent back upon themselves to embrace the horizontally disposed portions 29 of the feet or base members with the inwardly directed bight portions 30 disposed above the inwardly directed bent portions 31 and to these bight portions 30 I secure the hooked outer ends 32 of the links 33, which are formed of a single piece of material to provide parallel members, as in the second form, and whose bight portions 34 are adapted to engage with the hook ends 21$^a$ of the tensioning spring 16$^a$, as clearly shown in the drawings. The operation of this third type of invention is the same as the other forms hereinbefore described, and it will be seen that the ends of the auxiliary springs of all forms are slidably mounted upon feet or base supporting members, and limited in their sliding movement, so that the ends of the auxiliary springs cannot project beyond the sides of the structure or create a truss action between the frame and auxiliary springs when the latter are compressed by reason of the ends being slidably mounted.

What is claimed is:—

1. An auxiliary spring and mountings therefor for use in spring constructions, which spring constructions embody a frame and main springs mounted therein, said mountings each having an upwardly directed part and said auxiliary spring being in arch form and having slidable connection at its ends with the upwardly directed parts of said mountings.

2. An auxiliary spring and mountings therefor for use in spring constructions, which spring constructions embody a frame and main springs mounted therein, said mountings each having an upwardly directed part and said auxiliary spring being in arch form and having slidable connection at its ends with the upwardly directed parts of said mountings, and means to hold the arch spring under tension when the same is depressed and to return it to its normal position when relieved of pressure.

3. An auxiliary spring and mountings therefor for use in spring constructions, which spring constructions embody a frame and main springs mounted therein, said mountings each having an upwardly directed part and said auxiliary spring having slidable connection with the upwardly directed parts of the said mountings.

4. An auxiliary spring and mountings therefor for use in spring constructions, which spring constructions embody a frame and main springs mounted therein, said mountings each having an upwardly directed part, and the auxiliary springs having connection with the upwardly directed parts of said mountings.

5. An auxiliary spring and mountings therefor for use in spring constructions, which spring constructions embody a frame and main springs mounted therein, said mountings each having an upwardly directed part and said auxiliary spring having slidable connection with the upwardly directed parts of said mountings, and a spring to hold the auxiliary spring under tension when the same is depressed and to return it to its normal position when relieved of pressure.

6. An auxiliary spring and mountings therefor for use in spring constructions, which spring constructions embody a frame and main springs mounted therein, said mountings each having an upwardly directed part and the auxiliary spring having connection with the upwardly directed parts of said mountings, and means to hold the auxiliary spring under tension when the same is depressed and to return it to its normal position when relieved of pressure.

7. An auxiliary spring and mountings therefor for use in spring constructions which spring constructions embody a frame and main springs mounted therein, said mountings each having an upwardly directed part and said auxiliary spring being in arch form and having connection with the upwardly directed parts of said mountings.

8. An auxiliary spring and mountings therefor for use in spring constructions, which spring constructions embody a frame and main springs mounted therein, said mountings each having an upwardly directed part and said auxiliary spring being in arch form and having connection with the upwardly directed parts of said mountings, a helical spring disposed horizontally beneath the auxiliary arch spring, and connections between said helical spring and the ends of the auxiliary arch spring to maintain the arch spring under tension when depressed and to return it to its normal position when relieved of pressure.

9. An auxiliary spring, for use in spring constructions, which spring constructions embody a frame and main springs mounted therein, said auxiliary spring consisting of arched portions, base portions, and a tension spring detachably connected to said base portions.

10. An auxiliary spring, for use in spring constructions, which spring constructions embody a frame and main springs mounted therein, said auxiliary spring including an arched portion, base portions, and a tension spring connected to said base portions.

In testimony whereof I affix my signature, in presence of two witnesses.

WATSON R. SMITH.

Witnesses:
 ETHEL M. PHELAN,
 ERNEST I. McCUEN.